(12) United States Patent
Suzuki

(10) Patent No.: US 6,359,345 B1
(45) Date of Patent: Mar. 19, 2002

(54) HYBRID MOTIVE POWER VEHICLE

(75) Inventor: Takeshi Suzuki, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 09/604,278

(22) Filed: Jun. 26, 2000

(30) Foreign Application Priority Data

Jul. 6, 1999 (JP) .......................................... 11-191105

(51) Int. Cl.[7] .................................................. H02P 9/04
(52) U.S. Cl. ........................ 290/40 C; 322/10; 180/65.2
(58) Field of Search ........................... 290/40 C, 40 R, 290/40 A, 40 B; 322/10, 16, 17; 180/65.1, 65.2, 65.3, 65.4

(56) References Cited

U.S. PATENT DOCUMENTS

| | | | | |
|---|---|---|---|---|
| 4,588,040 A | * | 5/1986 | Albright, Jr. et al. | 180/165 |
| 6,020,697 A | * | 2/2000 | Shimasaki et al. | 318/140 |
| 6,083,138 A | * | 7/2000 | Aoyama et al. | 477/5 |
| 6,127,813 A | * | 10/2000 | Tamagawa | 322/16 |
| 6,186,255 B1 | * | 2/2001 | Shimasaki et al. | 180/65.3 |
| 6,294,843 B1 | * | 9/2001 | Kato et al. | 290/40 C |
| 2001/0011050 A1 | * | 8/2001 | Yamaguchi et al. | 477/3 |

FOREIGN PATENT DOCUMENTS

| | | |
|---|---|---|
| DE | 19631243 | 2/1997 |
| JP | 6-17727 | 1/1994 |
| JP | 10212983 | 8/1998 |

OTHER PUBLICATIONS

English Language Abstract of JP 6–17727.
English Language Abstract of JP 10–212983.

* cited by examiner

*Primary Examiner*—Nicholas Ponomarenko
(74) *Attorney, Agent, or Firm*—Greenblum & Bernstein, P.L.C.

(57) ABSTRACT

The present invention provides a hybrid motive power vehicle capable of performing a regenerative power generation using an electric motor without causing a strange feeling for a driver. A buffer clutch 5 adjustable in connection force is arranged in a power train system common to the electric motor 1 and an internal combustion engine 2. During an engine braking, the connection force of the buffer clutch 5 is maintained in a half-clutch state to transmit rotation of driving wheels to the electric motor 1 for regenerative power generation. Sliding of the buffer clutch 5 is utilized to prevent transmission of a rotation resistance of the electric motor 1 increased by the regenerative power generation, to the driving wheels, so as to enable to obtain a stable engine brake force without torque fluctuation.

8 Claims, 7 Drawing Sheets

HYBRID MOTIVE POWER VEHICLE

BACKGROUND OF THE INVENTION

1. Field of the Invention

The present invention relates to an improvement of a hybrid motive power vehicle comprising an electric motor and an internal combustion engine and in particular to eliminating a strange feeling during speed reduction and improving energy recovery in a hybrid motive power vehicle which performs regenerative power generation utilizing the electric motor during a speed reduction using as a load the rotation resistance of a power source.

2. Description of the Related Art

A hybrid motive power vehicle comprising an electric motor and an internal combustion engine and actuating one or both of them to drive the driving wheels is already known.

Moreover, in some of the hybrid motive power vehicles, during a speed reduction using a rotation resistance of a power source as a load, so-called engine brake, rotation of the driving wheels is transmitted via a power train system to an electric motor so as to force the electric motor to rotate, performing regenerative power generation. The electric power generated is stored in a battery so as to effectively use the energy.

However, in a case of hybrid motive power vehicle having a configuration that an electric motor and an internal combustion engine are always rotated as a unitary block, when an engine brake is actuated and the regenerative power generation is started by an electric motor, the rotation resistance by the internal combustion engine to which fuel supply has been stopped and the rotation resistance of the electric motor in regenerative power generation state function simultaneously and accordingly, the engine brake works stronger than in a normal motive power vehicle comprising only an internal combustion engine. Currently, the hybrid motive power vehicle using an electric motor and an internal combustion engine is not so popular and a driver who is accustomed to a normal motive power vehicle using only an internal combustion engine may feel a strange feeling when the engine brake of a hybrid motive power vehicle is working.

Moreover, there is a hybrid motive power vehicle having a power train clutch between the electric motor and the internal combustion engine, so that when actuating an engine brake, the power train clutch is actuated so as to disconnect the internal combustion engine from the power train system and utilize, for the engine brake, the electric motor instead of the internal combustion engine. In this case, the rotation resistance of the power source comes only from the electric motor. However, the speed reduction characteristic obtained by the internal combustion engine may be different from that of the electric motor and there is still a problem that the driver feels a strange feeling when the engine brake of a hybrid motive power vehicle is working. Moreover, because of the structure, it becomes difficult to adjust the engine brake by accelerator open degree.

SUMMARY OF THE INVENTION

It is therefore an object of the present invention to provide a hybrid motive power vehicle in which regenerative power generation is performed by an electric motor so as to effectively save the energy without causing driver a strange feeling when a speed reduction using a power source rotation resistance as a load, i.e., a so-called engine brake is actuated.

The present invention provides a hybrid motive power vehicle comprising an electric motor and an internal combustion engine, wherein during a constant speed running and an acceleration, at least one of the power sources is operated so that its drive force is transmitted to driving wheels via a power train system common to the electric motor and the internal combustion engine, and during a speed reduction using a rotation resistance of the power source as a load, rotation of the driving wheels is transmitted via the power train system to the electric motor so as to rotate the electric motor to perform a regenerative power generation, the vehicle further comprising a buffer clutch adjustable in connection force in the power train system and a buffer clutch control device for maintaining the connection force of the buffer clutch in a half-clutch state while the speed reduction is performed.

In this configuration, during a speed reduction using a rotation resistance of a power source as a load, i.e., a so-called engine braking, the buffer clutch control device operates so as to maintain a connection force of the buffer clutch in the half-clutch state. Since the buffer clutch is arranged in the power train system, even if a great rotation resistance for braking the driving wheels is generated at the upstream side of the power train system, the brake resistance actually functioning on the driving wheels is limited via the buffer clutch to a degree which can be transmitted. Accordingly, even if a great rotation resistance is generated by the rotation resistance of the internal combustion engine when the fuel supply is stopped and the rotation resistance of the electric motor in a regenerative power generation state, the force will not be directly transmitted to the driving wheels, preventing an excessive engine braking effect.

In order to obtain the engine brake characteristics of a conventional vehicle using only an internal combustion engine as a power source, the connection force of the half-clutch state of the buffer clutch is preferably set to transmit a force competing with the rotation resistance of the internal combustion engine.

Moreover, the aforementioned object can also be achieved as follows. The electric motor has an output shaft connected to an input shaft of the power train system and the vehicle further comprises: a power train clutch adjustable in connection force arranged between the output shaft of the internal combustion engine and the output shaft of the electric motor; and a power train clutch control device operating so that during a constant speed running above a predetermined speed and during an acceleration, the electric motor and the internal combustion engine are in a completely connected state via the power train clutch, and during a speed reduction using the rotation resistance of the power source as a load, the power train clutch is maintained in a half-clutch state, so that during the speed reduction the power train clutch in the half-clutch state slides so as to reduce the load of the rotation resistance given from the internal combustion engine to input shaft of the power train system while rotating the electric motor.

In this configuration, during a speed reduction using the rotation resistance of the power source as a load, i.e., engine braking, the power train clutch control device operates so as to maintain in the half-clutch state the connection force of the power train clutch connecting the output shaft of the internal combustion engine and the output shaft of the electric motor. Sliding of the power train clutch in the half-clutch state reduces the load of the rotation resistance given from the internal combustion engine to the input shaft of the power train system. The rotation resistance actually given to the input shaft of the power train system is a total of the rotation resistance of the internal combustion engine and the rotation resistance of the electric motor. Among them, the rotation resistance given from the internal combustion engine to the power train system is suppressed to a relatively low value. Accordingly, the total of the rotation resistance of the internal combustion engine and the rotation resistance of the electric motor will not cause an excessive rotation resistance functioning on the power train system, thus preventing an excessive engine braking effect.

In order to obtain the engine brake characteristic of a conventional vehicle having only an internal combustion engine as the power source, the connection force of the half-clutch state of the power train clutch is preferably set in such a manner that it is possible to transmit a force of the rotation resistance of the internal combustion engine subtracted by the rotation resistance of the electric motor, i.e., the total of the rotation resistance given to the input shaft of the power train system via the power train clutch and the rotation resistance given to the input shaft of the power train system from the electric motor is almost matched with the rotation resistance of the internal combustion engine.

Furthermore, it is also possible to simultaneously arrange the buffer clutch with the buffer clutch control device and the power train clutch with the power train clutch control device.

DESCRIPTION OF THE PREFERRED EMBODIMENTS

Figure 1:
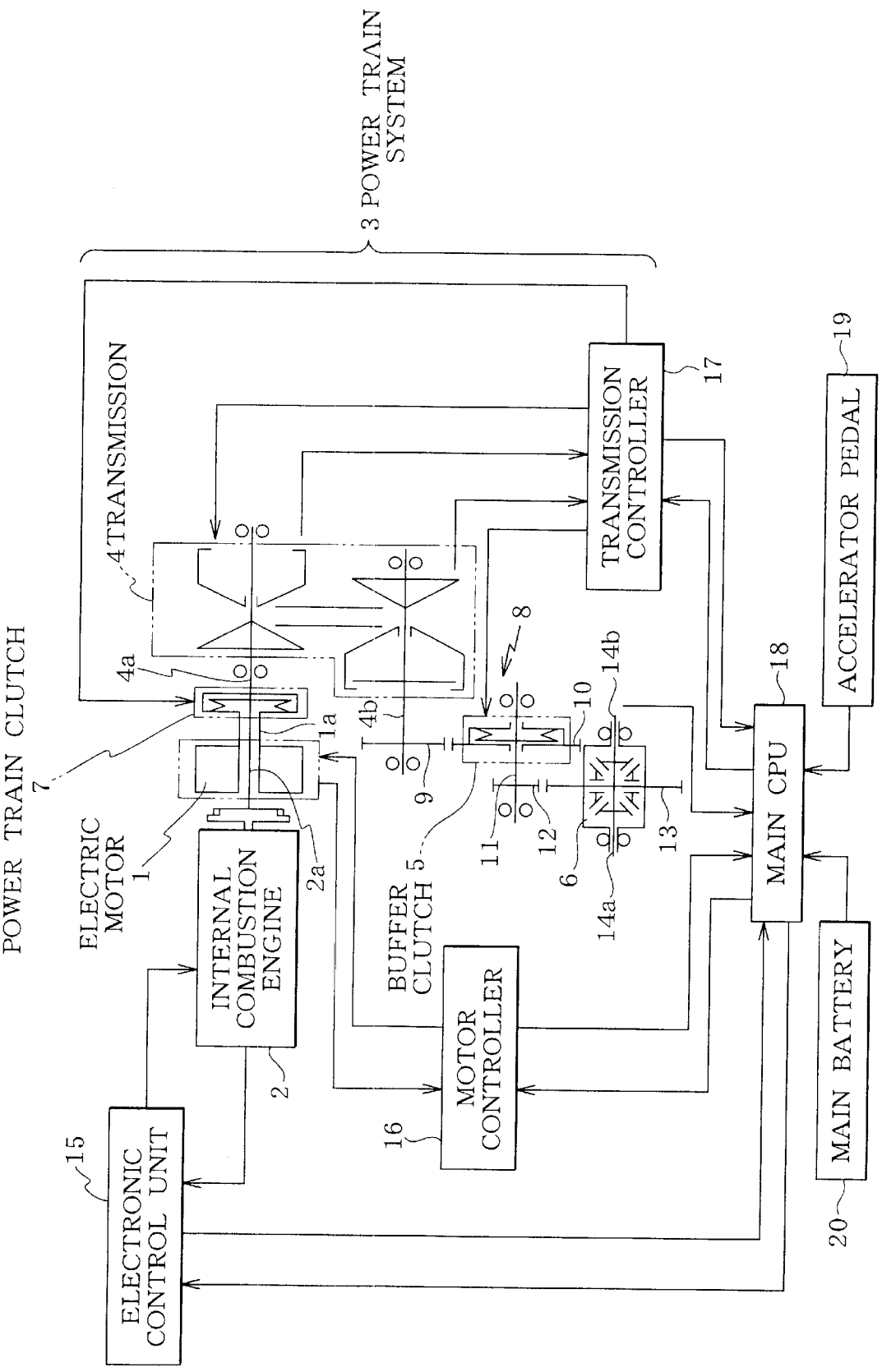
FIG. 1 is a conceptual view showing a motive power block of a hybrid motive power vehicle according to an embodiment of the present invention.
Figure 2:
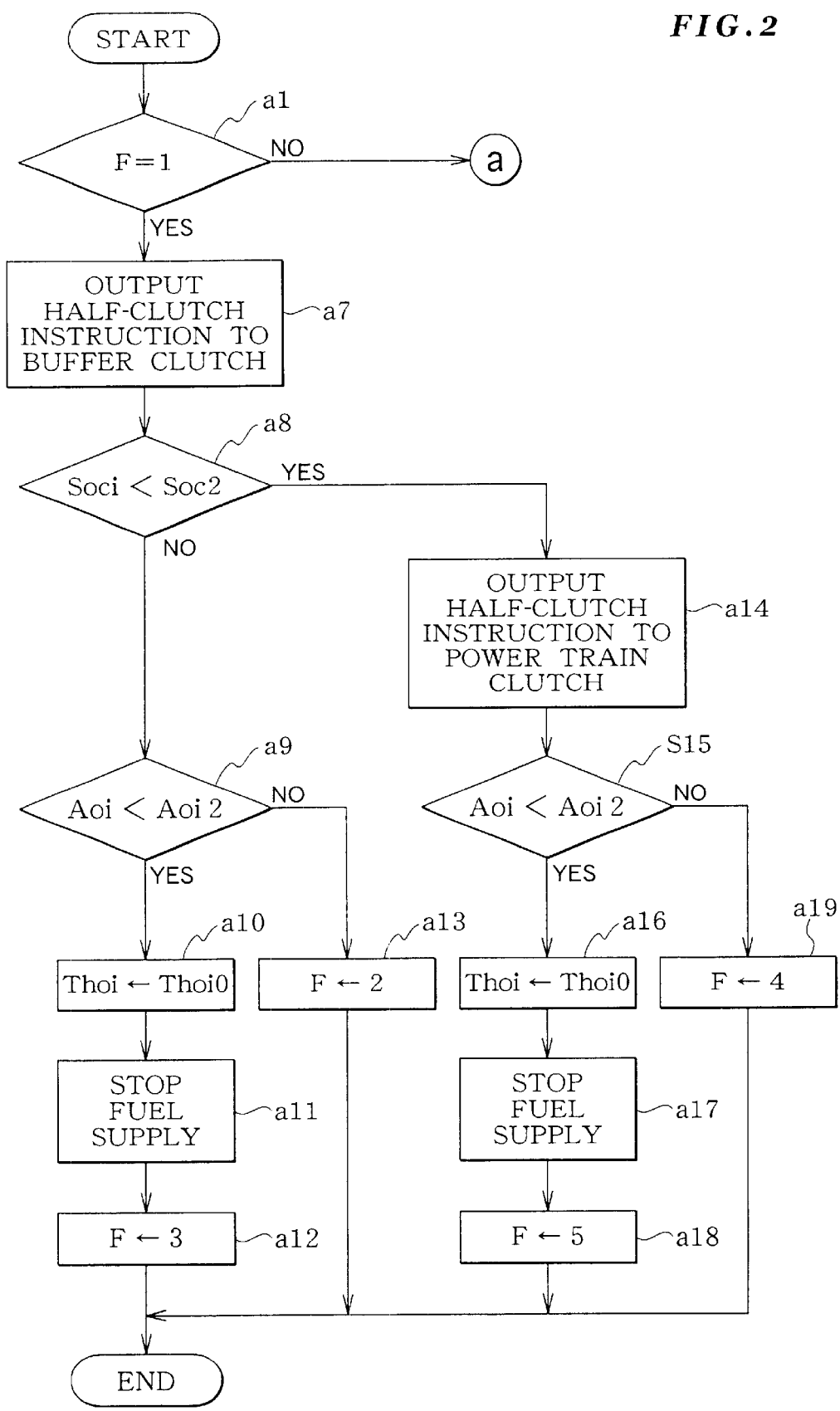
FIG. 2 is a flowchart showing an outline of engine brake control.
Figure 3:
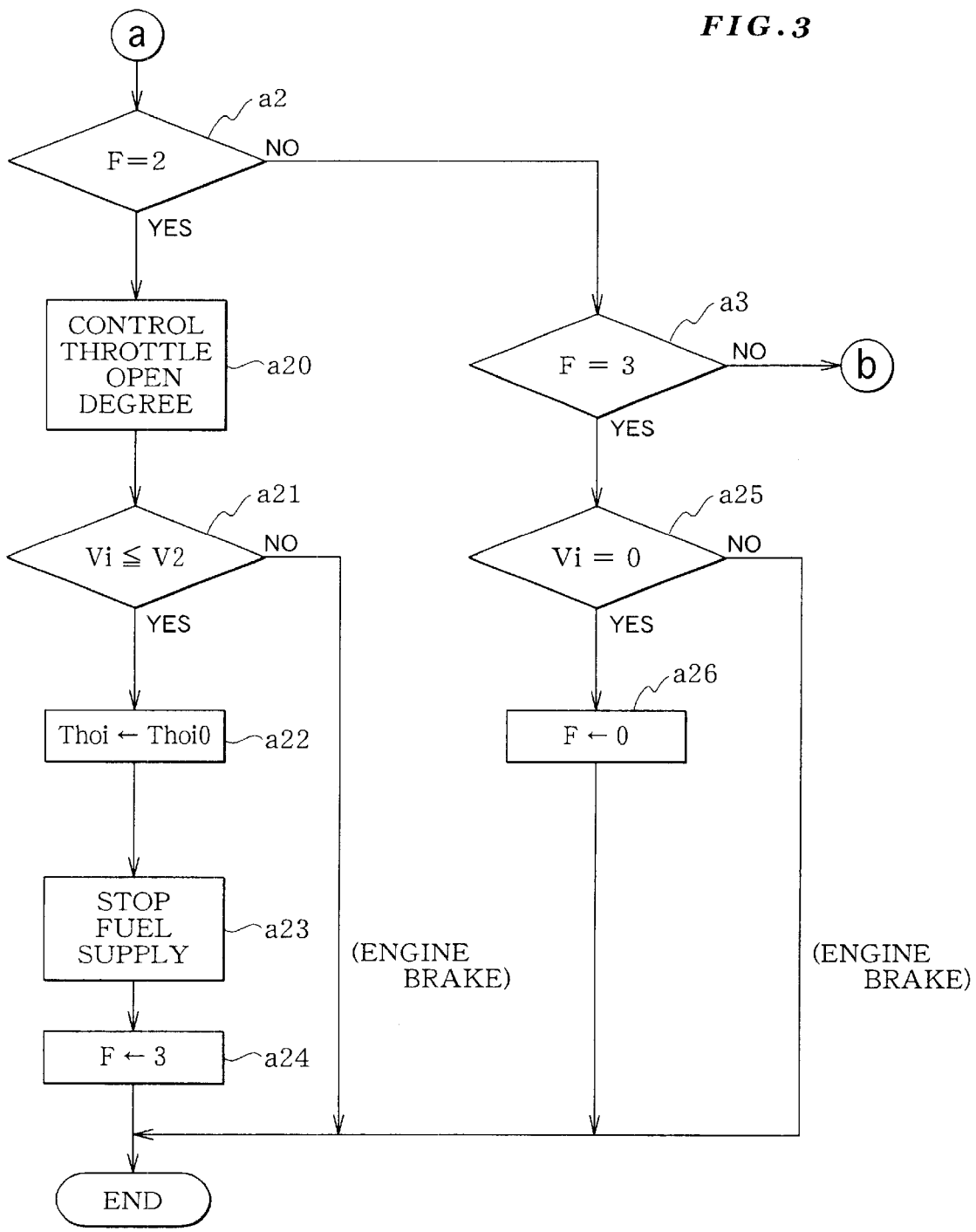
FIG. 3 is a continuation of the flowchart showing the outline of engine brake control.
Figure 4:
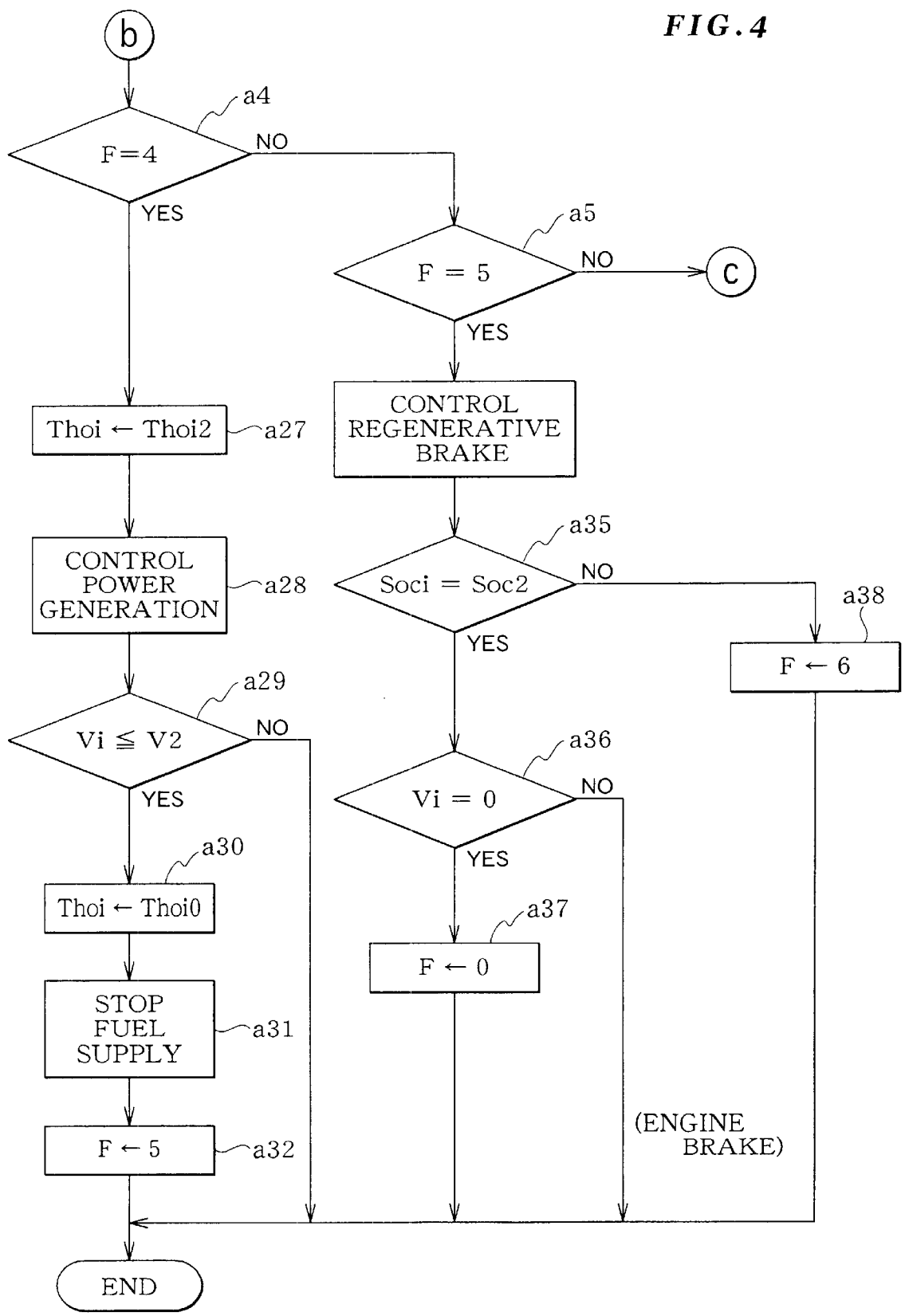
FIG. 4 is a continuation of the flowchart showing the outline of engine brake control.
Figure 5:
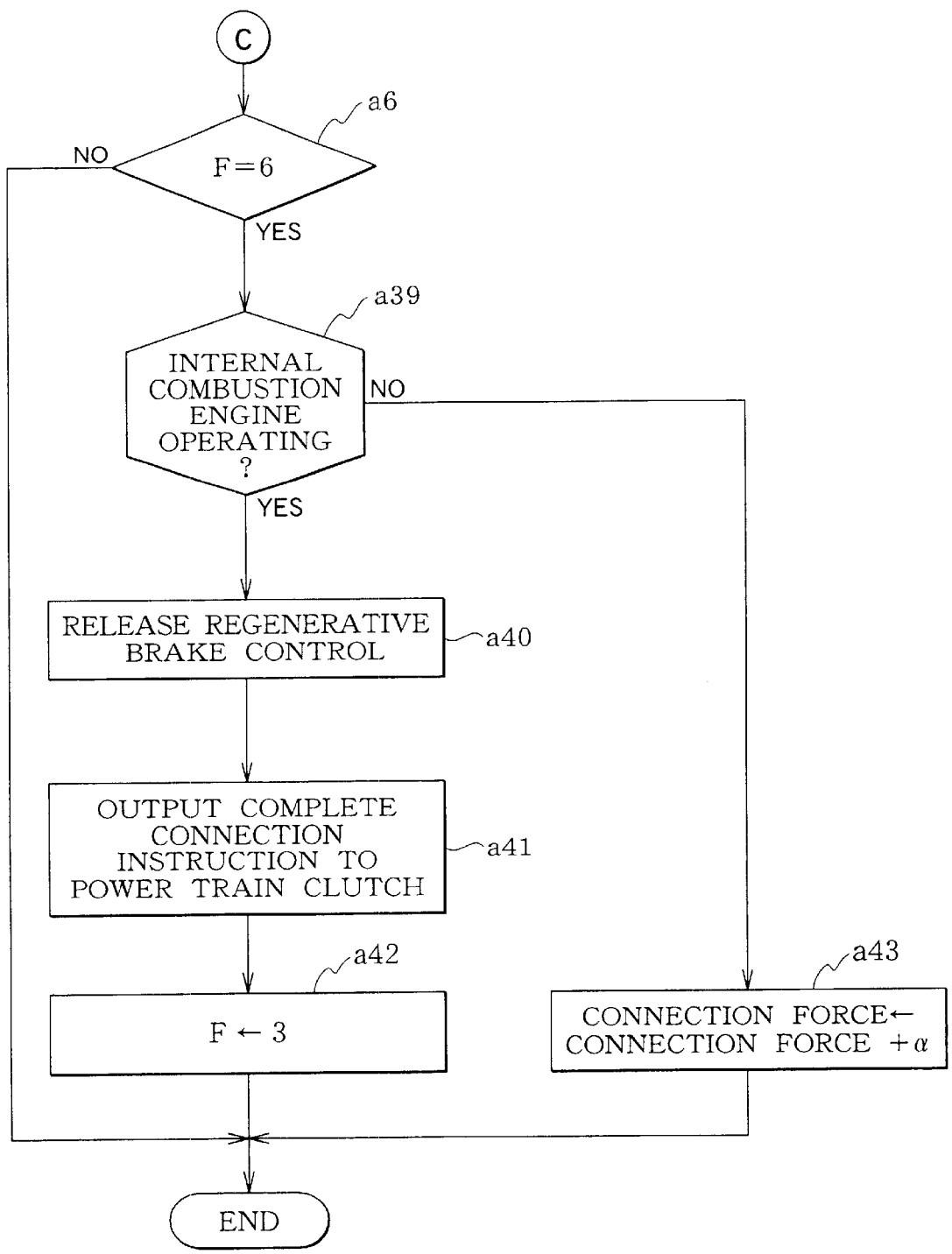
FIG. 5 is a continuation of the flowchart showing the outline of engine brake control.

Hereinafter, an explanation will be given on an embodiment of the present invention with reference to the attached drawings. FIG. 1 is a conceptual view of a motive power block of a hybrid motive power vehicle according to the embodiment of the present invention.

This motive power block includes an electric motor 1, an internal combustion engine 2, and a power train system 3 for the electric motor 1 and the internal combustion engine 2. The power train system 3 includes a transmission 4, a reduction gear unit 8, a buffer clutch 5 adjustable in connection force (slip controllable), and a differential gear unit 6.

In this embodiment, the transmission 4 is a belt type continuously variable automatic transmission but it can also be a hydraulic automatic transmission or a manual transmission.

The electric motor 1 has an output shaft 1a steadily connected to an input shaft 4a of the transmission 4. During a running of the vehicle, the output shaft 1a and a rotor of the electric motor 1 are steadily rotated. Moreover, the internal combustion engine 2 has an output shaft 2a connected to the output shaft 1a of the electric motor 1 via a power train clutch 7 adjustable in connection force (slip controllable).

During a running using only the electric motor 1 as a power source, the power train clutch 7 is in a complete disconnection. Only the output shaft 1a of the electric motor 1 is rotated to transfer a drive force to the input shaft 4a of the transmission 4 while the output shaft 2a of the internal combustion engine 2 is in a stop state. Moreover, during a running using the internal combustion engine 2 as a power source, the power train clutch 7 is in a complete connection, wherein the output shaft 2a of the internal combustion engine 2 and the output shaft 1a of the electric motor 1 are rotated as a unitary block and the drive force is transmitted to the input shaft 4a of the transmission 4. Here, the inertia of the rotor of the electric motor 1 functions as a load of the internal combustion engine 2.

On the other hand, the transmission 4 has an output shaft 4b to which an output gear 9 is fixed. This output gear 9 is engaged with an input gear 10 of the reduction gear unit 8. The input gear 10 is connected to a shaft 11 of the reduction gear unit 8 via the buffer clutch 5 adjustable in connection force. An output gear 12 is fixed to the shaft 11 of the reduction gear unit 8. This output gear 12 is engaged with an input gear 13 of the differential gear unit 6 to actuate the differential gear unit 6 to drive driving wheels attached to the output shafts 14a and 14b of the differential gear unit 6.

The power train clutch 7 and the buffer clutch 5 may be hydraulic type wet clutches, powder type clutches using a magnetic powder, or ordinary dry clutches or the like as long as they can be adjusted in connection force.

The internal combustion engine 2 is controlled by an electronic control unit 15 which issues instructions on the throttle angle (open degree), fuel injection, ignition timing, and the like. Moreover, the rpm and other data are fed back from the internal combustion engine 2 to the electronic control unit 15.

The electric motor 1 is controlled by a motor controller 16 which issues instructions on the drive torque, rpm, and the like. The rpm and other data are fed back from the electric motor 1 to the motor controller 16.

A transmission controller 17 has the conventional function to detect the rpm of the input shaft 4a and the output shaft 4b of the transmission 4 and to control the speed reduction ratio as well as a function to control connection and disconnection of the power train clutch 7 and the buffer clutch 5 and their connection force.

A main CPU 18 is a microprocessor to control the entire motive power block via the electronic control unit 15, the motor controller 16, the transmission controller 17, and the like. The main CPU 18 reads in the operation amount of an accelerator pedal 19 as a torque instruction value and issues various instructions to the electronic control unit 15, the motor controller 16, and the transmission controller 17.

The main CPU 18 can detect all the data passed between the electronic control unit 15 and the internal combustion engine 2, between the motor controller 16 and the electronic motor 1, and between the transmission controller 17 and the transmission 4. Furthermore, the rpm of the output shafts 14a and 14b, i.e., a running speed, detect ed by a tachometer provided in the differential gear unit 6 is fed to the ma in CPU 18. Moreover, a battery capacity of a main battery 20 used for driving the electric motor 1 is also detected by the main CPU 18.

Among the aforementioned components, the transmission controller 17 and the main CPU 18 constitute a main portion of the buffer clutch control means, power train clutch control means, and connection force setting means.

Figure 7:
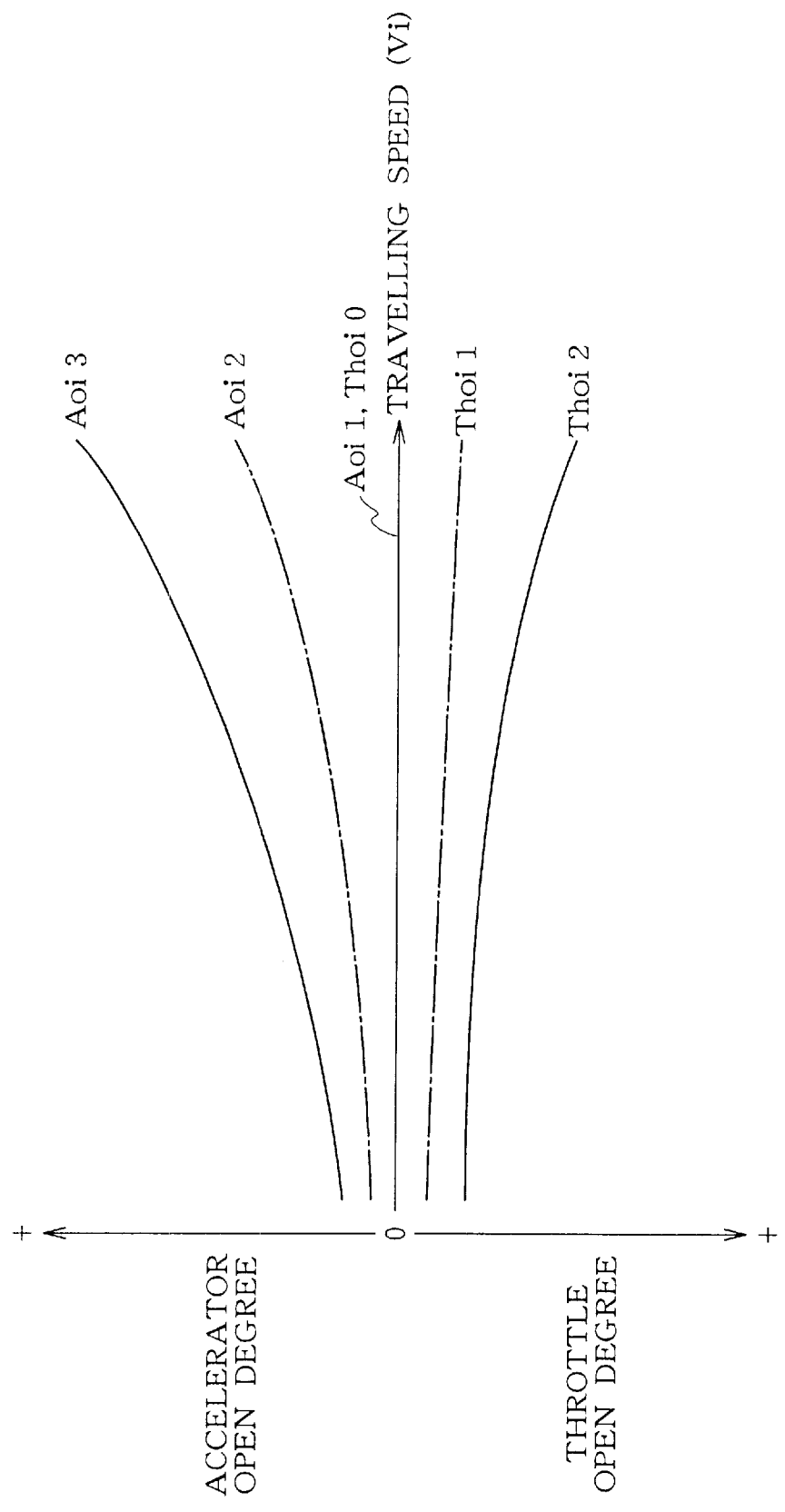
FIG. 7 is a conceptual view showing a relationship between the accelerator open degree and the internal combustion engine throttle angle (open degree) against a vehicle running speed on a flat road.

FIG. 7 is a conceptual view showing a relationship between the accelerator open degree (operation amount of the accelerator pedal 19) and the throttle angle (open degree) of the internal combustion engine 2 against a vehicle running speed on a flat road. A data corresponding to this conceptual view is stored as a map in the nonvolatile memory of the main CPU 18.

In FIG. 7, a curve Aoi3 represents an accelerator open degree required for maintaining a current vehicle running speed Vi overcoming various running resistances including a road resistance (hereinafter, referred to as the running speed maintaining open degree), and a curve Thoi2 represents a throttle open degree of the internal combustion engine corresponding to the running speed maintaining open degree (hereinafter, referred to as the running speed maintaining output open degree).

Moreover, a curve Aoi2 represents an accelerator open degree when the output of the internal combustion engine 2 is 0, i.e., no drive output is obtained from the internal combustion engine 2 and the internal combustion engine 2 causes no rotation resistance to the power train system 3 (hereinafter, referred to as the output constant open degree). A curve Thoi1 represents a throttle open degree of the internal combustion engine 2 corresponding to the aforementioned state (hereinafter, referred to as the output constant output open degree).

The Aoi1 represents the entirely closed state of the accelerator and corresponding to this Thoi0 represents the entirely closed state of the throttle for the internal combustion engine 2. Here, the engine brake is fully working.

Figure 6:
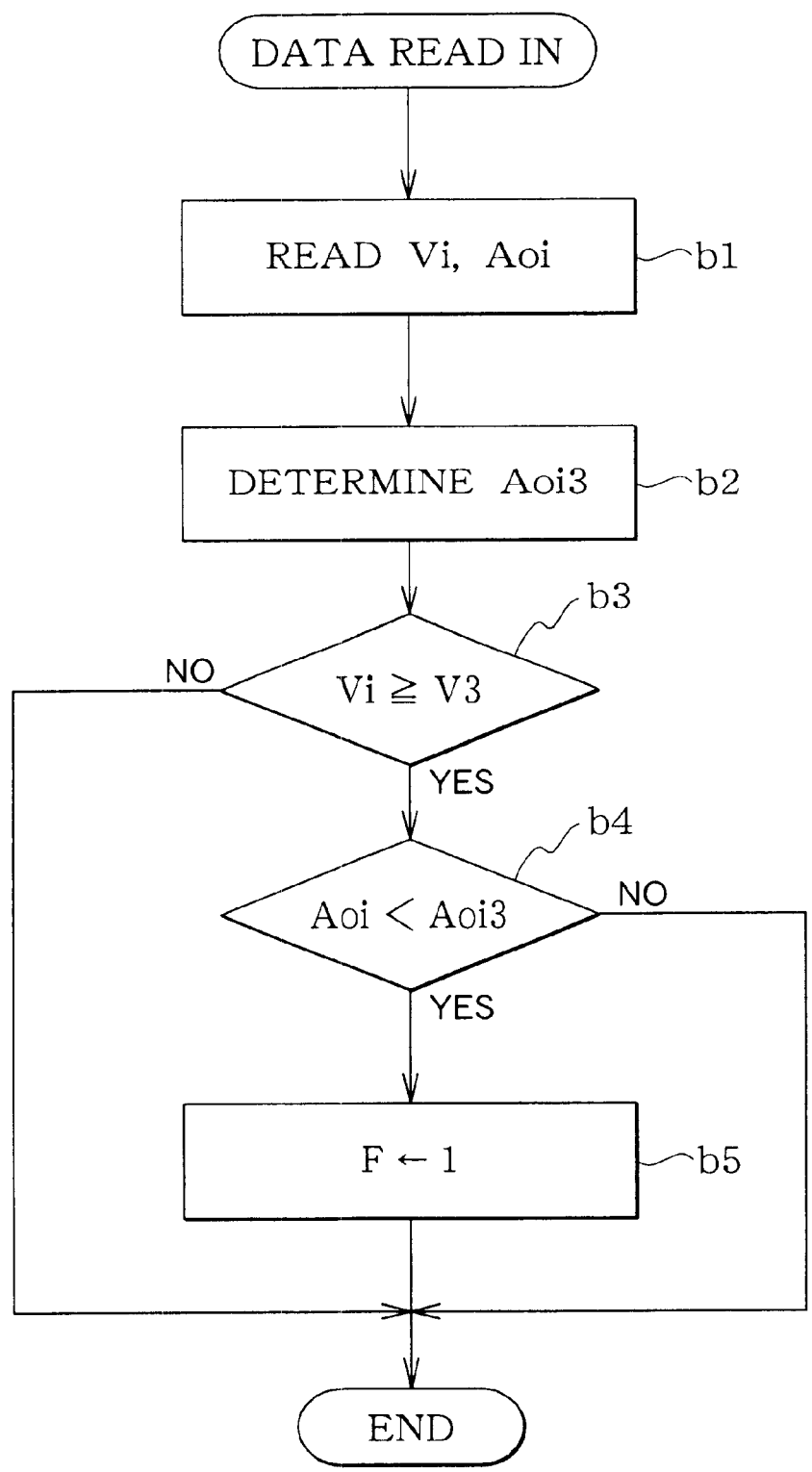
FIG. 6 is a flowchart showing an outline of a data read in process.

FIG. 2 to FIG. 5 are a flowchart showing an outline of an engine brake control process employed in the present embodiment. Moreover, FIG. 6 is a flowchart showing an outline of a data read in process for collecting data items required for the engine brake control process. These processes are repeatedly performed at a predetermined process cycle by the main CPU 18.

Firstly, the main CPU 18, as shown in FIG. 6, reads a current value Vi of the vehicle running speed from the tachometer of the differential gear unit 6 and a current value Aoi of the accelerator open degree (step b1) and referring to a map as shown in FIG. 6, determines the running speed maintaining open degree Aoi3 corresponding to the current value Vi of the vehicle running speed (step b2).

Subsequently, the main CPU 18 determines whether the current value Vi of the vehicle running speed exceeds a predetermined value V3, i.e., whether a comparatively high speed running is performed using only the internal combustion engine 2 as a power source (step b3). If yes, the main CPU 18 further determines whether the current value Aoi of the operation amount of the accelerator pedal 19 is below the running speed maintaining open degree Aoi3 (step b4).

If yes, the main CPI 18 determines that the accelerator pedal is operated by the driver to obtain engine brake and sets 1 to an engine brake control execution flag F (step b5).

Otherwise, 1 is not set for the engine brake control execution flag F. That is, 1 is not set for the engine brake control execution flag F if a low speed running is performed using only the electric motor 1 as the power source, if the power source is being switched from the electric motor 1 as a starter to the internal combustion engine 2, or if the running speed maintaining open degree Aoi3 is exceeded or the accelerator pedal 19 is operated to exceed Aoi3 for a steady running or running with acceleration.

Simultaneously with the data read in process, the main CPU 18 repeatedly performs the engine brake control process shown in FIG. 2 to FIG. 5 at a predetermined process cycle. The initial value of the engine brake control execution flag F is 0 and no substantial engine break control process is performed until 1 is set for the engine break control execution flag F in the aforementioned data read in process. Only the determination process of steps a1 to a6 are repeatedly performed at a predetermined process cycle.

When 1 is set for the engine break control execution flag F by the aforementioned data read in process, the main CPU 18 detects this in the determination process of step a1. Next, the main CPU 18 as the buffer clutch control means and connection force setting means sets a connection force capable of transmitting a force competing a rotating resistance of the internal combustion engine 2, i.e., a connection force not transmitting a force greater than the maximum engine break using only the internal combustion engine 2, and outputs a half-clutch instruction to the buffer clutch 5 (step a7).

Next, the main CPU 18 reads a current value Soci of the battery capacity of the main battery 20 and determines whether the value is below a predetermined value Soc2, i.e., whether the main battery 20 should be charged (step a8)

If no, i.e., if the battery capacity current value Soci is above the predetermined value Soc2 and no charging is required, the main CPU 18 determined whether the current value Aoi of the operation value of the accelerator pedal 19 is below the output constant open degree Aoi2, i.e., an engine brake using the rotation resistance of the power source is desired or a weak brake using only the running resistance is desired (step a9)

If the current amount Aoi of the operation amount of the accelerator pedal 19 is below the output constant open degree Aoi2, i.e., if an engine brake using the rotation resistance of the power source is desired, the main CPU 18 sets value Thoi0 for the entirely closed state of the throttle as the current value Thoi of the throttle open degree (step a10), stops fuel supply to the internal combustion engine 2 (step a11), and sets a value 3 indicating an engine brake is in progress for the engine brake control execution flag F (step a12), terminating the engine brake control process of this cycle.

Since 3 is set in the engine brake control execution flag F, in the following cycles of the engine brake control process, the determination processes of steps a1 to a3 as well as the determination process of step 25 (whether the vehicle running speed current value Vi has become 0) are repeatedly executed. The vehicle running speed current value Vi used here is a latest value of the vehicle running speed which is read in at a predetermined cycle, i.e., a real time vehicle running speed.

Until step a25 determines that the vehicle running speed current value Vi is 0, the main CPU 18 maintains the entirely closed state of the throttle Thoi0, i.e., the state wherein the engine brake by the internal combustion engine 2 is fully working, while repeating steps a1 to a3 and step a25 at a predetermined cycle.

Lastly, when the vehicle running speed current value Vi has become 0 in step a25, the engine brake control execution flag F is initialized to 0 (step a26), completing the process associated with the engine brake control.

Moreover, if step a8 is no (the main battery 20 need not be charged) and step a9 is no (a weak brake using only the running resistance is desired), the main CPU 18 sets a value 2 (a weak brake) in the engine brake control execution flag F (step a13), terminating the engine brake control process of this cycle.

After 2 is set in the engine brake control execution flag F, in the following engine brake control process, steps a1 and a2 as well as steps a20 and a21 are repeatedly executed. Step a20 controls the throttle open degree current value Thoi according to the current value Aoi of the operation amount of the accelerator pedal 19. Step a21 determines whether the vehicle running speed current value Vi is equal to or below a predetermined amount V2.

Until step a21 determines that the vehicle running speed current value Vi is equal to or below the predetermined value V2, the main CPU 18 gradually decreases the throttle open degree Thoi according to the current value Aoi of the operation amount of the accelerator pedal 19 and gradually actuates a weak brake by the internal combustion engine 2 while repeatedly executing steps a1 and a2 and steps a20 and a21 at a predetermined cycle.

Lastly, when step a21 determines that the vehicle running speed current value Vi has become equal to or below the predetermined value V2, the throttle value Thoi0 of the entirely closed state is set as the current value Thoi (step a22), fuel supply to the internal combustion engine 2 is stopped (step a23), 3 is set in the engine brake control execution flag F3 (step a24), terminating the engine brake control process of this cycle.

The process after this is identical as the engine brake control using the rotation resistance of the internal combustion engine, i.e., when 3 is set in the engine brake control execution flag F, and its explanation will be omitted.

On the other hand, if step a8 is determined to be yes, i.e., if the main battery 20 need be charged, the main CPU 18 as power train clutch control means sets a connection force capable of transmitting a force in the order of the rotation force of the internal combustion engine 2 subtracted by the rotation resistance of the electric motor 1 and outputs a half-clutch instruction to the power train clutch 7 (step a14).

Next, the main CPU 18 determines whether the current value Aoi of the operation amount of the accelerator pedal 19 is below the output constant open degree Aoi2, i.e., whether an engine brake using the rotation resistance of the power source is desired or a weak brake using only the running resistance is desired (step a15).

If the current value Aoi of the operation amount of the accelerator pedal 19 is below the output constant open degree Aoi2, i.e., if an engine brake using the rotation resistance of the power source is desired, the main CPU 18 sets the entirely closed state of the throttle, i.e., the value Thoi0, as the current value of the throttle open degree (step a16), stops fuel supply the internal combustion engine 2 (step a17), and sets a value 5 in the engine brake control execution flag F indicating that electric charge and engine brake are in progress (step a18), terminating the engine brake control process of this cycle.

After 5 is set in the engine brake control execution flag F, in the following cycle of the engine brake control process, steps a1 to a5 and step a34 for the regenerative brake control are executed.

In this regenerative brake control, a drive force from the driving wheels is transmitted via the power train system 3 to the electric motor 1 so as to force the electric motor 1 to rotate to generate an electric power, which is accumulated in the main battery 20, and the rotation resistance of the electric motor 1 generated by the regenerative power generation and the rotation resistance of the internal combustion engine 2 are used for actuating an engine brake for the vehicle.

In this stage, the throttle open degree current value Thoi has been set to the value Thoi0 corresponding to the entirely closed state of the throttle and the fuel supply to the internal combustion engine 2 has been stopped. Accordingly, the internal combustion engine 2 can output a maximum engine brake. However, there is a power transmission efficiency loss due to sliding of the power train clutch 7 between the output shaft 2a of the internal combustion engine 2 and the output shaft 1a of the electric motor 1. Consequently, the rotation resistance functioning on the input shaft 4a of the transmission 4, i.e., the total of the rotation resistance of the internal combustion engine 2 and the rotation resistance of the electric motor 1 functioning via the power train clutch 7 is almost identical to the engine brake force of the internal combustion engine subtracted by the aforementioned loss and added by the rotation resistance of the electric motor 1, i.e., the rotation resistance inherent to the internal combustion engine 2. This is because, as has been described above, the force which can be transmitted by the power train clutch 7 is limited to a force of the rotation resistance of the internal combustion engine 2 subtracted by the rotation resistance of the electric motor 1.

Accordingly, even if regenerative power generation is performed using the electric motor 1 while engine brake utilizing the rotation resistance of the internal combustion engine 2 is working, the driver does not feel a strange feeling that the engine brake is working too much. The driver can have a brake feeling identical to the conventional vehicle in which only the internal combustion engine 2 is used as the power source.

Moreover, even if failure of the power train clutch 7 or other reason causes the rotation resistance functioning on the input shaft 4a of the transmission 4 to exceed the engine brake force obtained only by the internal combustion engine 2, the buffer clutch 5 is provided at the downstream of the power train system 3. This buffer clutch 5 has an upper limit of power transmission to a degree capable of transmitting a force competing with the rotation resistance of the internal combustion engine 2 and accordingly, the braking force transmitted up to the driving wheels is limited to the engine brake force of the internal combustion engine 2 at the most.

After completing the process of step a34 associated with the regenerative brake control, the main CPU 18 reads in the current value Soci of the battery capacity of the main battery 20 and determines whether this value is below the predetermined value Soc2, i.e., whether the main battery 20 need further charged (step s35).

If the current value Soci of the battery capacity is below the predetermined value Soc2 and the battery need be further charged, the main CPU 18 further determines whether the current value Vi of the vehicle running speed has become 0, i.e., whether the vehicle has stopped (step a36). If the vehicle has not stopped, 5 is maintained in the engine brake control execution flag F and the engine brake control process of this cycle is completed, leaving the engine brake by the internal combustion engine 2 and the electric motor 1 working.

Until the current value Soci of the battery capacity of the main battery 20 exceeds the predetermined value Soc2 and step a35 becomes false or until the vehicle stops and step a36 becomes true, the main CPU 18 maintains the current value Thoi of the throttle open degree at the entirely closed state Thoi0 while repeating steps a1 to a5, step a 34 (regenerative brake control), and steps a35 to a36, so as to perform speed reduction by engine brake using the internal combustion engine 2 and the electric motor 1 as well as charging of the main battery 20 utilizing the regenerative power generation by the forced rotation of the electric motor 1.

If the current value Soci of the battery capacity of the main battery 20 does not exceed the predetermined value Soc2, i.e., if the charging of the main battery 20 is not complete even after the aforementioned process is repeated, the main CPU 18, after confirming that the current value Vi of the vehicle running speed has become 0 in step a 37, initializes the engine brake control execution flag F to 0 (step a37) and terminates the engine brake control and the process associated with the regenerative power generation.

On the other hand, if charging of the main battery 20 is complete before the current value Vi of the vehicle running speed becomes 0 and step a35 becomes false, the main CPU sets 6 in the engine brake control execution flag F (step a38) indicating that the regenerative power generation is stopped and the system is progressing to the engine brake process by the internal combustion engine 2 and terminates the engine brake control process of this cycle.

After 6 is set in the engine brake control execution flag F, in the following cycle of the engine brake control process, steps a1 to a6 and step a39 (internal combustion engine start determination process) are executed.

This internal combustion engine start determination process determines whether rotation of the electric motor 1 is transmitted to the internal combustion engine 2 via the power train clutch 7. This determination is substantially performed by comparing the rpm of the electric motor 1 and the rpm of the internal combustion engine 2. That is, if these rpm values coincide, this means that the internal combustion engine 2 is started, and if the rpm values do not coincide, this means that the internal combustion engine 2 is not sufficiently started.

It should be noted that the start here does not mean active rotation of the internal combustion engine 2 by combustion. At this stage, the throttle open degree Thoi is in the entirely closed state and the fuel supply is stopped. Accordingly, the internal combustion engine 2 will not be rotated actively by combustion.

If step a39 is false, i.e., if the start of the internal combustion engine 2 is insufficient, the main CPU 18 slightly increases the connection force of the power train clutch 7 so that the rotation of the electric motor 1 is surely transmitted to the internal combustion engine 2 via the power train clutch 7 (step a43). The reason why the internal combustion engine 2 is started at this stage is that it is necessary to reduce the rotation resistance of the electric motor 1 due to stop of the regenerative power generation and to obtain a proper engine brake force only by the rotation resistance of the internal combustion engine 2.

Until the start of the internal combustion engine 2 is confirmed in step a39, the main CPU 18 repeatedly performs the processes of steps a1 to a6, step a39, and step a43. When the start of the internal combustion engine 2 is confirmed in step a39, charging of the main battery 20 by regenerative power generation is stopped (step a40), a complete connection instruction is issued to the power train clutch 7 so that the output shaft 2a of the internal combustion engine 2 rotates as a unitary block with the output shaft 1a of the electric motor 1 and the input shaft 4a of the transmission 4 (step a41), and 3 is set in the engine brake control execution flag F (step a42), thus completing the engine brake control process of this cycle.

The process after this is identical to the process of the aforementioned normal engine brake control, i.e., when 3 is set in the engine brake control execution flag F, and its explanation is omitted.

When the main battery 20 is sufficiently charged, the charging by the regenerative power generation is automatically stopped and the normal engine brake control is started. Accordingly, it is possible to prevent deterioration or damage of the main battery 20 due to overcurrent. Moreover, the rpm of the internal combustion engine 2 is matched with the rpm of the electric motor 1 before the internal combustion engine 2 is completely connected to the electric motor 1. Accordingly, there will not arise a shock due to operation of the power train clutch 7. Moreover, the regenerative power generation by the electric motor 1 is stopped before the power train clutch 7 is completed connected for using the engine brake force of the internal combustion engine 2. Accordingly, there will not be an abrupt increase of the rotation resistance working on the input shaft 4a of the transmission 4. This prevents a strange feeling of overworking of the engine brake and enables to obtain a brake feeling similar to that of the conventional vehicle.

On the other hand, if step a8 is true, i.e., the main battery 20 need be charged and step a15 is false, i.e., a weak brake using only the running resistance is desired, the main CPU 18 sets 4 indicating a weak brake in the engine brake control execution flag F (step a19), thus completing the engine brake control process of this cycle.

After 4 is set in the engine brake control execution flag F, in the following cycle of the engine brake control process, steps a1 to a4 and steps a27 to a29 are repeatedly performed. Step a27 is a process for setting as the current value Thoi the running speed maintaining output open degree Thoi2 corresponding to the current value Vi of the vehicle running speed. Step a28 is a process for controlling power generation. Step a29 is a process to determine whether the current value Vi of the vehicle running speed is equal to or below the predetermined value V2.

Until step a29 determines that the current value Vi of the vehicle running speed is equal to or below the predetermined value V2, the main CPU 18 successively updates the throttle open degree Thoi by setting the running speed maintaining output open degree Thoi2 corresponding to the current value Vi of the vehicle running speed, so that a weak brake is gradually actuated while repeating the steps a1 to a4 and steps a27 to a29 for each of predetermined cycles. As has been described above the running speed maintaining output open degree Thoi2 is an accelerator open degree value required for maintaining the current vehicle running speed Vi overcoming various running resistances including the road resistance. However, at this stage, the power train clutch 7 is already in a half-clutch state and not all of the drive force of the internal combustion engine 2 is transmitted to the input shaft 4a of the transmission 4. Even if the throttle open degree Thoi is updated by successively setting the running speed maintaining output open degree Thoi2 corresponding to the current value Vi of the vehicle running speed, the current value of the vehicle running speed is gradually attenuated and lowered. The phenomenon that the vehicle running speed current value Vi is gradually reduced in this way is the weak brake.

In the power generation control process of step a28, the electric motor 1 is only rotated for power generation without accumulating the power in the main battery 20. It is also possible to perform a regenerative power generation by the process of step a28 so that power is accumulated in the main battery 20. In such a case, it is necessary to involve the aforementioned process of step a35 in this loop so as to detect the battery capacity. If the current value Soci of the battery capacity exceeds the predetermined value Soc2, it is recommended to prevent overcurrent by switching the regenerative power generation including charging of the main battery 20 to a simple power generation process not including charging of the main battery 20.

When it is confirmed in step a29 that the vehicle running speed current value Vi has become equal to or below the predetermined value V2, the main CPU 18 sets the value Thoi0 for the entirely closed state of the throttle as the current value Thoi of the throttle open degree (step a30), stops the fuel supply to the internal combustion engine 2 (step a31), and sets 5 indicating engine brake in progress, in the engine brake control execution flag F (step a 32), thus completing the engine brake control process of this cycle.

The process after this identical to the case of the aforementioned engine brake control and regenerative power generation control using the electric motor 1 and the internal combustion engine 2, i.e., when 5 is set in the engine brake control execution flag F and its explanation is omitted.

The aforementioned process is performed when the operation amount Aoi of the accelerator pedal 19 is returned from the running speed maintaining open degree Aoi3 to actuate the engine brake. The accelerator pedal 19 may be again operated for acceleration while the aforementioned process is performed. In the same way as the aforementioned data read in process, the operation of the accelerator pedal 19 can be detected by a process repeated for each predetermined cycle. Moreover, in the present embodiment, the value of the engine brake control execution flag F indicates what kind of speed reduction process has been performed at the moment and accordingly, the engine brake operation can easily be switched to an acceleration operation.

For example, if the value of the engine brake control execution flag F is 3, the capacity of the main battery 20 is sufficient and no regenerative power generation is performed by the electric motor 1. Moreover, the throttle open degree Thoi is in the entirely closed state and the fuel supply to the internal combustion engine 2 is stopped. The power train clutch 7 is in the connected state and the buffer clutch 5 is in the half-clutch state. Accordingly, in order to start acceleration from this state, the fuel supply is resumed and the throttle open degree Thoi is set again according to the operation amount Aoi of the accelerator pedal 19, the power train clutch 7 is set into the half-clutch state, and the internal combustion engine 2 is again started before the power train clutch 7 is again set to the connected state and the engine brake control execution flag F is initialized to 0. Here, it is also possible to set the buffer clutch 5 directly to the completely connected state. However, if this is connected step by step, it is possible to perform more stable acceleration.

Moreover, if the value of the engine brake control execution flag F is 2, the capacity of the main battery 20 is sufficient and no regenerative power generation is performed by the electric motor 1. Moreover, the throttle open degree Thoi is normally controlled according to the operation amount Aoi of the acceleration pedal 19 and the fuel supply to the internal combustion engine 2 has not been stopped. The power train clutch 7 is in the connected state and the buffer clutch 5 is in the half-clutch state. Accordingly, in order to start acceleration from this state, what is necessary is simply to initialize the engine brake control execution flag F to 0.

On the other hand, if the value of the engine brake control execution flag F is 5, the capacity of the main battery 20 is insufficient and the regenerative power generation is performed by the electric motor 1. Moreover, the throttle open degree Thoi is in the entirely closed state and the fuel supply to the internal combustion engine is stopped. The power train clutch 7 and the buffer clutch 5 are both in the half-clutch state. Accordingly, in order to start acceleration from this state, it is necessary to stop the regenerative power generation, resume the fuel supply, set the throttle open degree Thoi according to the operation amount Aoi of the accelerator pedal 19, and restart the internal combustion engine 2 before setting the power train clutch 7 to the connected state and initializing the engine brake control execution flag F to 0. Here, the buffer clutch 5 can be set directly to the completely connected state. However, by performing this step by step, it is possible to perform more stable acceleration.

Moreover, if the value of the engine brake control execution flag F is 4, the throttle open degree Thoi is controlled by the running speed maintaining output open degree Thoi2 according to the current value Vi of the vehicle running speed and the fuel supply to the internal combustion engine 2 has not been stopped. Moreover, the power train clutch 7 and the buffer clutch 5 are both in the half-clutch state. Accordingly, in order to start acceleration from this state, it is necessary to reset the throttle open degree Thoi according to the operation amount Aoi of the accelerator pedal 19, set the power train clutch 7 to the connected state, and initialize the engine brake control execution flag F to 0.

In this embodiment, the buffer clutch 5 and the power train clutch 7 are used for making the engine brake work smoothly. However, as has been described above, the upper limit of the power transmission by the buffer clutch 5 is set to transmit a force competing with the rotation resistance of the internal combustion engine 2 while the engine brake is working. Accordingly, by providing the buffer clutch 5 in the power train system 3 and controlling its connection force, it is possible, during engine braking, to eliminate the brake force equivalent to the rotation resistance of the electric motor 1 and to give the driving wheels only the engine brake force equivalent to the rotation resistance of the internal combustion engine 2.

Moreover, the buffer clutch 5 has a function to absorb a fluctuation torque and is arranged at the downstream of the transmission 4 in the power train system 3. Accordingly, it is possible to absorb a shock at speed change even when the transmission 4 is a manual transmission.

In the hybrid motive power vehicle according to the present invention, a buffer clutch adjustable in connection force is arranged in a power train system common to an electric motor and an internal combustion engine as power sources. During a speed reduction using a rotation resistance of the power sources, i.e., a so-called engine brake, the buffer clutch is maintained in a half-clutch state so that rotation of driving wheels is transmitted to the electric motor for regenerative power generation. Accordingly, even if the rotation resistance of the electric motor is increased by the regenerative power generation, no excessive brake force is transmitted to the driving wheels. It is possible to perform the regenerative power generation while obtaining a stable engine brake force without torque fluctuation.

Since the buffer clutch in the half-clutch state can transmit up to a force competing with the rotation resistance of the internal combustion engine, the substantial engine brake effect is almost identical to a conventional motive power vehicle having only an internal combustion engine. Even a driver who has accustomed to driving a vehicle having only the internal combustion engine can obtain an expected engine brake force without feeling a strange feel while driving a hybrid motive power vehicle.

Moreover, the electric motor has an output shaft connected to an input shaft of the power train system and a power train clutch adjustable in connection force is arranged between the output shaft of the internal combustion engine and the output shaft of the electric motor. During a speed reducing using the rotation resistance of a power source, i.e., a so-called engine braking, the connection force of the power train clutch is maintained in the half-clutch state for transmitting the rotation of the driving wheels to the electric motor for regenerative power generation. Accordingly, a part of the rotation resistance given to the input shaft of the power train system from the internal combustion engine can be eliminated by sliding of the power train clutch. Consequently, even if the rotation resistance of the electric motor is increased by the regenerative power generation, it is possible to suppress the substantial total of the rotation resistance of the electric motor and the rotation resistance caused by the internal combustion engine. Thus, it is possible to perform regenerative power generation while obtaining a stable engine brake having no torque fluctuation.

Since the connection force of the half-clutch connection by the power train clutch is limited to transmission of a force of the rotation resistance of the internal combustion engine subtracted by the rotation resistance of the electric motor. Accordingly, it is possible to substantially match the total of rotation resistance actually functioning on the input shaft of the power train system with the rotation resistance obtained only by the internal combustion engine. Consequently, the substantial engine brake effect is almost equivalent to a conventional motive power vehicle having only the internal combustion engine and a driver accustomed to a vehicle having only the internal combustion engine can obtain an expected engine brake force when driving a hybrid motive power vehicle.

Furthermore, a buffer clutch and a power train clutch are provided so that an excessive brake force exceeding the rotation resistance of the internal combustion engine is eliminated by the buffer clutch in the power train system and the rotation resistance itself functioning on the input shaft of the power train system is made almost constant by the function of the power train clutch. Accordingly, it is possible to obtain a high reliability for eliminating torque fluctuation at engine braking as compared to a case having only one of the clutches. Even if one of the clutches has failed, it is possible to maintain a practically sufficient function.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-191105 (Filed on Jul. $6^{th}$, 1999) including specification, claims, drawings and summary are incorporated herein by reference in its entirety.

What is claimed is:

1. A hybrid motive power vehicle comprising an electric motor and an internal combustion engine, wherein during a constant speed running and an acceleration, at least one of the power sources is operated so that its drive force is transmitted to driving wheels via a power train system common to the electric motor and the internal combustion engine, and during a speed reduction using a rotation resistance of the power source as a load, rotation of the driving wheels is transmitted via the power train system to the electric motor so as to rotate the electric motor to perform a regenerative power generation, the vehicle further comprising a buffer clutch adjustable in connection force in the power train system and a buffer clutch control device for maintaining the connection force of the buffer clutch in a half-clutch state while the speed reduction is performed.

2. A hybrid motive power vehicle as claimed in claim 1, the vehicle further comprising a connection force setting device for setting the half-clutch state of the buffer clutch, so that a force competing with the rotation resistance of the internal combustion engine can be transmitted by the connection force of the half-clutch state of the buffer clutch.

3. A hybrid motive power vehicle as claimed in claim 2, wherein the electric motor has an output shaft connected to an input shaft of the power train system and the vehicle further comprises: a power train clutch adjustable in connection force arranged between the output shaft of the internal combustion engine and the output shaft of the electric motor; and a power train clutch control device operating so that during a constant speed running above a predetermined speed and during an acceleration, the electric motor and the internal combustion engine is in a completely connected state via the power train clutch, and during a speed reduction, the power train clutch is maintained in a half-clutch state.

4. A hybrid motive power vehicle as claimed in claim 3, wherein the half-clutch state of the power train clutch is adjusted so that a force in the order of the rotation resistance of the internal combustion engine subtracted by the rotation resistance of the electric motor can be transmitted by the connection force of the half-clutch state of the power train clutch.

5. A hybrid motive power vehicle as claimed in claim 1, wherein the electric motor has an output shaft connected to an input shaft of the power train system and the vehicle further comprises: a power train clutch adjustable in connection force arranged between the output shaft of the internal combustion engine and the output shaft of the electric motor; and a power train clutch control device operating so that during a constant speed running above a predetermined speed and during an acceleration, the electric motor and the internal combustion engine is in a completely connected state via the power train clutch, and during a speed reduction, the power train clutch is maintained in a half-clutch state.

6. A hybrid motive power vehicle as claimed in claim 5, wherein the half-clutch state of the power train clutch is adjusted so that a force in the order of the rotation resistance of the internal combustion engine subtracted by the rotation resistance of the electric motor can be transmitted by the connection force of the half-clutch state of the power train clutch.

7. A hybrid motive power vehicle comprising an electric motor and an internal combustion engine, wherein during a constant speed running and an acceleration, at least one of the power sources is operated so that its drive force is transmitted to driving wheels via a power train system common to the electric motor and the internal combustion engine, and during a speed reduction using a rotation resistance of the power source as a load, rotation of the driving wheels is transmitted via the power train system to the electric motor so as to rotate the electric motor to perform a regenerative power generation, and wherein the electric motor has an output shaft connected to an input shaft of the power train system and the vehicle further comprises: a power train clutch adjustable in connection force arranged between the output shaft of the internal combustion engine and the output shaft of the electric motor; and a power train clutch control device operating so that during a constant speed running above a predetermined speed and during an acceleration, the electric motor and the internal combustion engine are in a completely connected state via the power train clutch, and during a speed reduction, the power train clutch is maintained in a half-clutch state.

8. A hybrid motive power vehicle as claimed in claim 7, wherein the half-clutch state of the power train clutch is adjusted so that a force in the order of the rotation resistance of the internal combustion engine subtracted by the rotation resistance of the electric motor can be transmitted by the connection force of the half-clutch state of the power train clutch.

* * * * *